J. E. BRODIE.
COUPLING FOR AIR BRAKE PIPES.
APPLICATION FILED DEC. 28, 1908.
923,112.
Patented May 25, 1909.
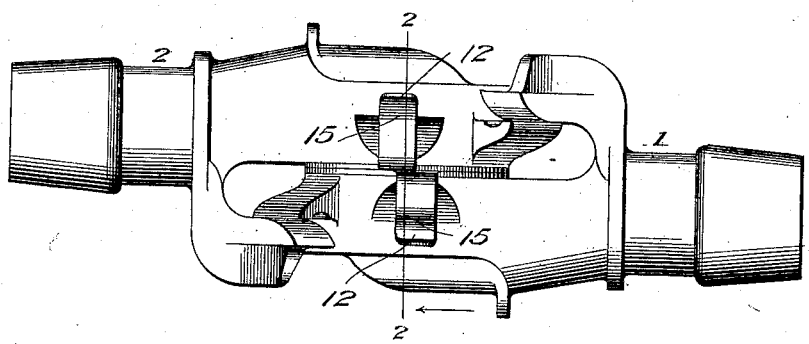

UNITED STATES PATENT OFFICE.

JOHN E. BRODIE, OF ROCHESTER, NEW YORK, ASSIGNOR OF ONE-HALF TO CHRISTOPHER GREY, OF ROCHESTER, NEW YORK.

COUPLING FOR AIR-BRAKE PIPES.

No. 923,112.  Specification of Letters Patent.  Patented May 25, 1909.

Application filed December 28, 1908. Serial No. 469,688.

*To all whom it may concern:*

Be it known that I, JOHN E. BRODIE, of Rochester, in the county of Monroe and State of New York, have invented a new and useful Improvement in Couplings for Air-Brake Pipes, which improvement is fully set forth in the following specification and shown in the accompanying drawings.

This invention relates to certain new and useful improvements in couplings for air brake pipes.

It is a well-known fact by those having had experience in this line that the rubber packing rings employed in such devices are very difficult to remove from the heads when the rings are worn out or become useless. These couplings, being between the ends of the cars and beneath the platforms, are subject to dust, dirt, ice and snow when the trains are running, the two sections of the coupling, or heads occasionally becoming frozen together. Often when coupling up the air pipes operating the air brakes, the packing rings are found worn out or in such condition that the coupling will not make a close joint. Oftentimes a train is delayed from ten to fifteen or twenty minutes before starting out from a station on account of having to dig out one of the old practically inaccessible rings to substitute therefor a new one to make a tight joint. These old rings frequently become frozen into the heads and sometimes rusted in so that several minutes of valuable time are lost before they can be dug out and the seat or screw properly cleared to receive a new ring.

The present invention has for its objects among others to provide a simple and improved construction whereby the above difficulties are overcome and the packing ring held securely in position but permitting of easy removal and replacing of a new one.

I provide a pivoted retainer for the packing ring, having a portion overlapping the groove or seat in the head and bearing against a flange on the packing ring. Suitable means are provided for holding this retainer in its closed position, whether such retainer be in the form of a complete ring or a segment thereof. The rings project beyond the retainer sufficiently to have direct contact with each other when the parts are coupled so as to insure a tight joint as heretofore.

Other objects and advantages of the invention will hereinafter appear and the novel features thereof will be particularly pointed out in the appended claims.

The invention is capable of embodiment in a variety of forms, two of which I have chosen to herein illustrate.

The invention, in such forms, is clearly illustrated in the accompanying drawings, which, with the numerals of reference marked thereon, form a part of this specification, and in which—

Figure 1 is a side elevation showing the two heads in coupled position. Fig. 2 is a vertical section on the line 2—2 of Fig. 1, looking in the direction of the arrow. Fig. 3 is a plan view of a portion of the head. Fig. 4 is a perspective view of the form of retainer seen in Fig. 3 removed. Fig. 5 is a plan view of a portion of a head with a modified form of retainer, a portion being broken away. Fig. 6 is a perspective view of the form of retainer shown in Fig. 5.

Like numerals of reference indicate like parts throughout the several views.

Referring to the drawings 1 and 2 designate the couplings which are of any well-known or approved form of construction except as hereinafter specified. The two heads are alike in substantially all respects and a detail description of one will suffice for both. As seen in Fig. 2, the head 3 is provided upon its acting face with an annular groove 4 in which is seated the rubber packing ring 5 having an offset or shoulder portion 6. 7 is a retainer for this ring. In the form shown in Figs. 1 to 4, this retainer is in the form of an annular plate having a central opening 8 through which projects the smaller annular portion 9 of the packing ring. This plate is slightly resilient and is provided with an opening 10 through which passes the pivot or pin 11 by which it is pivotally mounted upon the face of the head. In practice, this retainer is moved around out of the way upon its pivot, giving full access to the packing ring. The packing ring having been placed in position, the retainer is swung around upon its pivot into the position in which it is seen in Fig. 3. The retainer is provided at a point opposite its pivot with a handle portion 12 which extends from the periphery thereof and is inclined in opposite directions, as seen at 13 and 14, to form an inward bend, as at 15 which engages into a shallow recess 16 in the side of the head, as seen clearly in Fig. 2, to firmly hold the retainer in place. When thus in place, the inner portion of the retainer surrounding the opening 8 engages over the offset or shoulder portion 6 of the ring and presses it firmly to its seat, the smaller annular portion 9 of the ring projecting through the opening 8, as clearly seen in Fig. 2.

To turn the annular retainer off of the rubber packing ring to uncover the latter, the same has to be lifted up at one side by the said handle sufficient to swing it off of the rubber ring. This retainer, being made of flexible elastic metal, springs near its pivot when thus lifted off of the rubber ring. The pivot heads are not drawn down tightly against the retainer, there being a little freedom of motion of the retainer under the head of the rivet.

As seen clearly in Fig. 2, the retainers are slightly countersunk, as seen at 17, and the heads 18 of the rivets or pivots are disposed in such countersinks so as to avoid contact of the heads of the rivets with the retainers when the heads are coupled.

It will be noted that when the retainer is turned around on its pivot, the packing ring is free to be removed and a new one put in position, when the retainer is moved back to its normal position and its handle portion engaging in the recess of the head, the same is automatically locked against accidental movement.

In Figs. 5 and 6, I have shown another form of embodiment of the invention in which the retainer, instead of being in the form of a complete ring, comprises substantially a half ring 19 having at one end an opening 20 for the reception of its pivot 21, the other end being extended to form a handle portion 22, which carries a depending pin 23 which is designed to engage in an opening 24 in the face of the head to hold the half ring in closed position. A thin portion of the head is cut away, as seen at 25, to make room for this half ring, the cut away portion or recess being of the same depth as the thickness of the retainer, so that, when the retainer is in position, the outer face thereof will be in the same plane as the corresponding portion 26 of the head. When the retainer is closed, its square face 27 abuts against the square shoulder 28, formed on the face of the head by the cutting away of the portion to receive said ring, as will be readily understood upon reference to Fig. 5. When this half ring is turned back, the rubber packing ring is wholly uncovered half way around and may be easily lifted up and drawn out from under the inwardly overhanging ledge of the head and a new ring slipped laterally thereunder. When the retainer is swung back into place, the pin or stud 23 snaps into the hole in the head and firmly holds the retainer in place.

In the form shown in Figs. 1 to 4, the seat for the flange of the rubber packing ring passes into an under cut groove, there being an overhanging ledge all around over the packing ring. In the form shown in Fig. 5, this inwardly overhanging ledge is formed half on the head and half on the retainer.

Modifications in detail may be resorted to without departing from the spirit of the invention or sacrificing any of its advantages.

What I claim is:—

1. An air brake coupling having its head provided with a groove for a packing ring, and a flexible retainer pivotally mounted upon the head to one side of said groove and having a portion to overlap the groove and receive the projecting portion of the packing ring and a portion projecting from the periphery of said retainer, and means operated by said projecting portion for engagement with the head to lock the retainer in place.

2. An air brake coupling having its head provided with a groove for a packing ring, and a flexible retainer pivotally mounted upon the head to one side of said groove and having a portion to overlap the groove and receive the projecting portion of the packing ring and having a handle portion and locking device adapted to spring into engagement with a depression on the head.

3. An air brake coupling having its head provided with a cut away portion and a pivotally mounted retainer having a portion to overlap the seat for the packing ring and provided with a handle portion and a locking device at an angle to the handle portion and adapted to spring into engagement with a coöperating depression on the head.

4. An air brake coupling having its head provided with a cut away portion and a pivotally mounted retainer of a semi-ring form having a portion to overlap the seat for the packing ring and provided with a handle portion and a locking device, the outer face of the retainer and that of the uncut away portion of the head being in the same plane.

In witness whereof, I have hereunto set my hand this 22nd day of December, 1908, in the presence of two subscribing witnesses.

JOHN E. BRODIE.

Witnesses:
E. B. WHITMORE,
A. M. WHITMORE.